(12) United States Patent
Ihm (10) Patent No.: US 7,336,050 B2
(45) Date of Patent: Feb. 26, 2008

(54) CONTROL SYSTEM AND METHOD FOR PERMANENT MAGNET SYNCHRONOUS MOTOR

(75) Inventor: Hyung Bin Ihm, Seoul (KR)

(73) Assignee: Hyundai Motor Company, Seoul (KR)

( * ) Notice: Subject to any disclaimer, the term of this patent is extended or adjusted under 35 U.S.C. 154(b) by 598 days.

(21) Appl. No.: 11/023,702

(22) Filed: Dec. 27, 2004

(65) Prior Publication Data
US 2005/0140329 A1    Jun. 30, 2005

(30) Foreign Application Priority Data
Dec. 30, 2003    (KR) .................... 10-2003-0100759

(51) Int. Cl.
*H02P 1/46*     (2006.01)
*H02P 1/50*     (2006.01)
*H02P 3/18*     (2006.01)
*H02P 6/00*     (2006.01)
*H02P 23/00*    (2006.01)

(52) U.S. Cl. .................. 318/714; 318/432; 318/434
(58) Field of Classification Search ............ None
See application file for complete search history.

(56) References Cited
FOREIGN PATENT DOCUMENTS

| | | |
|---|---|---|
| JP | 2001-199799 | 7/2001 |
| JP | 2004-056839 | 2/2004 |

*Primary Examiner*—Lincoln Donovan
*Assistant Examiner*—Erick Glass
(74) *Attorney, Agent, or Firm*—Morgan Lewis & Bockius LLP (57) ABSTRACT

The control system for controlling a permanent magnet synchronous motor includes: a position detection member, an angular speed calculator, a speed controller, a current command generator, a three phase/d-q coordinate converter, a current controller, a d-q/three phase coordinate converter, and an inverter. The speed controller generates a torque command based on a difference between an angular speed command value and the calculated angular speed. The current command generator generates a q-axis current command and a d-axis current command corresponding to the torque command and the angular speed. The three phase/d-q coordinate converter generates a q-axis current feedback signal and a d-axis current feedback signal. The current controller generates a q-axis voltage command and a d-axis voltage command. The d-q/three phase coordinate converter converts the q-axis current command and the d-axis current command into three phase voltage commands. The inverter outputs a driving voltage for driving the permanent magnet synchronous motor using the three phase voltage commands.

18 Claims, 8 Drawing Sheets

CONTROL SYSTEM AND METHOD FOR PERMANENT MAGNET SYNCHRONOUS MOTOR

CROSS REFERENCE TO RELATED APPLICATIONS

This application claims priority to Korean Application No. 10-2003-0100759, filed on Dec. 30, 2003, the disclosure of which is incorporated herein by reference.

TECHNICAL FIELD

The present invention relates to a control system for a permanent magnet synchronous motor and a control method thereof.

BACKGROUND

Generally, in an interior permanent magnet synchronous motor (IPMSM), a permanent magnet is inserted into a rotator. The interior permanent magnet synchronous motor has characteristics suitable for being used in a motor of a hybrid electric vehicle because it has good durability and good drivability at high speeds. In addition, the interior permanent magnet synchronous motor has a reluctance torque so that a large output can be obtained, and also has nonlinear parameters.

In such an interior permanent magnet synchronous motor, a motor current is determined such that a compound torque, made up of a general electromagnetic torque and a reluctance torque, is maximized.

In addition, in the interior permanent magnet synchronous motor, flux weakening control is needed to obtain good output characteristics and drivability at high speeds. A precise torque control is also needed under nonlinear parameter conditions.

In a prior permanent magnet synchronous motor control method, a control is performed based on a model of a motor. That is, a current applying angle θ for an operation with a maximum torque is calculated. Furthermore, a control, in a type of flux weakening feedback loop or magnetic flux command feedforward, is performed for the flux weakening control. However, because errors in calculation result due to the nonlinearity of the parameters, performance of the motor becomes erratic and preciseness of control deteriorates.

Further, the calculates amount for the control is excessive, so it is difficult to realize such control. Furthermore, in prior control methods based on the motor model, it is difficult to consider characteristics of the permanent magnet synchronous motor, thereby making it difficult to obtain maximum torque operation and uniform flux weakening operation performance.

The information disclosed in this Background of the Invention section is only for enhancement of understanding of the background of the invention and should not be taken as an acknowledgement or any form of suggestion that this information forms the prior art that is already known to a person skilled in the art.

SUMMARY

An embodiment of the present invention provides a control system and a control method of a permanent magnet synchronous motor which is capable of performing a maximum torque operation and a flux weakening operation.

In a preferred embodiment of the present invention, the control system for controlling a permanent magnet synchronous motor includes: a position detection member for detecting an absolute angular position of the permanent magnet synchronous motor and outputting a corresponding signal; an angular speed calculator calculating an angular speed using the signal of the position detection member; a speed controller generating a torque command based on a difference between an angular speed command value and the calculated angular speed; a current command generator receiving the torque command from the speed controller and the angular speed from the angular speed calculator, and generating a q-axis current command and a d-axis current command corresponding to the torque command and the angular speed using one of either predetermined motoring current command data or predetermined generating current command data; a three phase/d-q coordinate converter for generating a q-axis current feedback signal and a d-axis current feedback signal based on driving currents applied to the permanent magnet synchronous motor and the signal of the position detection member; a current controller generating a q-axis voltage command and a d-axis voltage command based on a difference between the q-axis current command and the q-axis current feedback signal and a difference between the d-axis current command and the d-axis current feedback signal; a d-q/three phase coordinate converter converting the q-axis current command and the d-axis current command into three phase voltage commands; and an inverter outputting a driving voltage for driving the permanent magnet synchronous motor using the three phase voltage commands.

It is preferable that the predetermined motoring current command data comprises predetermined motoring q-axis current command data and predetermined motoring d-axis current command data, and that the predetermined generating current command data comprises predetermined generating q-axis current command data and predetermined generating d-axis current command data.

It is further preferable that the predetermined motoring q-axis current command data include a plurality of optimal q-axis current command values that are respectively determined with respect to a plurality of torque values and a plurality of angular velocities when the permanent magnet synchronous motor operates in a motoring mode, that the predetermined motoring d-axis current command data include a plurality of optimal d-axis current command values that are respectively determined with respect to a plurality of torque values and a plurality of angular velocities when the permanent magnet synchronous motor operates in the motoring mode, that the predetermined generating q-axis current command data include a plurality of optimal q-axis current command values that are respectively determined with respect to a plurality of torque values and a plurality of angular velocities when the permanent magnet synchronous motor operates in a generating mode, and that the predetermined generating d-axis current command data include a plurality of optimal d-axis current command values that are respectively determined with respect to a plurality of torque values and a plurality of angular velocities when the permanent magnet synchronous motor operates in the generating mode.

Preferably, the current command generator selects one of either the motoring current command data or the generating current command data based on the torque command and the angular speed, and generates the q-axis current command and the d-axis current command at the torque command and the angular speed using the selected data.

Further preferably, if both the angular speed and the torque command are greater than 0, the current command generator selects the predetermined motoring current command data, and generates the q-axis current command and the d-axis current command at the torque command and the angular speed using the predetermined motoring current command data.

It is preferable that if the angular speed is greater than 0 and the torque command is not greater than 0, the current command generator selects the predetermined generating current command data, and generates the q-axis current command and the d-axis current command at the torque command and the angular speed using the predetermined generating current command data.

It is also preferable that if the angular speed is not greater than 0 and the torque command is greater than 0, the current command generator selects the predetermined generating current command data, and generates the q-axis current command and the d-axis current command at the torque command and the angular speed using the predetermined generating current command data.

It is preferable that if both the angular speed and the torque command are not greater than 0, the current command generator selects the predetermined motoring current command data, and generates the q-axis current command and the d-axis current command at the torque command and the angular speed using the predetermined motoring current command data.

Preferably, the current command generator calculates the q-axis current command and the d-axis current command at the torque command and the angular speed through interpolation using the selected data.

It is preferable that the current command generator generates the q-axis current command as a value acquired by multiplying the calculated q-axis current command that is calculated from the selected data by −1 if the angular speed is less than 0.

It is also preferable that if the torque command is greater than a predetermined maximum torque, the current command generator resets the torque command with the predetermined maximum torque and generates the q-axis current command and the d-axis current command at the reset torque command and the angular speed.

In another embodiment of the present invention, a control method for controlling a permanent magnet synchronous motor comprises: detecting an absolute angular position of the permanent magnet synchronous motor; calculating an angular speed based on the detected absolute angular position; generating a torque command based on a difference between an angular speed command value and the calculated angular speed; generating a q-axis current command and a d-axis current command corresponding to the torque command and the angular speed, based on one of either predetermined motoring current command data or predetermined generating current command data; calculating a q-axis current feedback signal and a d-axis current feedback signal, based on driving currents applied to the permanent magnet synchronous motor and the detected absolute angular position; generating a q-axis voltage command and a d-axis voltage command, based on a difference between the q-axis current command and the q-axis current feedback signal and a difference between the d-axis current command and the d-axis current feedback signal; converting the q-axis voltage command and the d-axis voltage command into three phase voltage commands; and outputting driving voltages for driving the permanent magnet synchronous motor, based on the converted three phase voltage commands.

It is preferable that the predetermined motoring current command data comprises predetermined motoring q-axis current command data and predetermined motoring d-axis current command data, and that the predetermined generating current command data comprises predetermined generating q-axis current command data and predetermined generating d-axis current command data.

It is further preferable that the predetermined motoring q-axis current command data include a plurality of optimal q-axis current command values that are respectively determined with respect to a plurality of torque values and a plurality of angular velocities when the permanent magnet synchronous motor operates in a motoring mode, that the predetermined motoring d-axis current command data include a plurality of optimal d-axis current command values that are respectively determined with respect to a plurality of torque values and a plurality of angular velocities when the permanent magnet synchronous motor operates in the motoring mode, that the predetermined generating q-axis current command data include a plurality of optimal q-axis current command values that are respectively determined with respect to a plurality of torque values and a plurality of angular velocities when the permanent magnet synchronous motor operates in a generating mode, and that the predetermined generating d-axis current command data include a plurality of optimal d-axis current command values that are respectively determined with respect to a plurality of torque values and a plurality of angular velocities when the permanent magnet synchronous motor operates in the generating mode.

It is preferable that the generating of a q-axis current command and a d-axis current command comprises: selecting one of either the motoring current command data or the generating current command data based on the torque command and the angular speed; and generating the q-axis current command and the d-axis current command at the torque command and the angular speed using the selected data.

It is further preferable that the selecting comprises: resetting the torque command with a predetermined maximum torque value if the torque command is greater than the predetermined maximum torque value, or maintaining the torque command if the torque command is not greater than the predetermined maximum torque value; determining whether the angular speed is greater than 0; determining whether the torque command is greater than 0; and selecting the predetermined motoring current command data if both the angular speed and the torque command are greater than 0, selecting the predetermined generating current command data if the angular speed is greater than 0 and the torque command is not greater than 0, selecting the predetermined generating current command data if the angular speed is not greater than 0 and the torque command is greater than 0, or selecting the predetermined motoring current command data if both the angular speed and the torque command are not greater than 0.

It is preferable that the generating of the q-axis current command and the d-axis current command comprises: calculating the d-axis current command corresponding to the torque command and the angular speed through interpolation using the selected data; and calculating the q-axis current command corresponding to the torque command and the angular speed through interpolation using the selected data.

It is further preferable that the calculating of the q-axis current command generates the q-axis current command as a value acquired by multiplying the calculated q-axis current command that is calculated from the selected data by −1 if the angular speed is less than 0.

BRIEF DESCRIPTION OF THE DRAWINGS

The accompanying drawings, which are incorporated in and constitute a part of the specification, illustrate an embodiment of the invention, and, together with the description, serve to explain the principles of the invention, where.

DETAILED DESCRIPTION OF THE EMBODIMENTS

Hereinafter, a preferred embodiment of the present invention will be described in detail with reference to the accompanying drawings.

Figure 1:
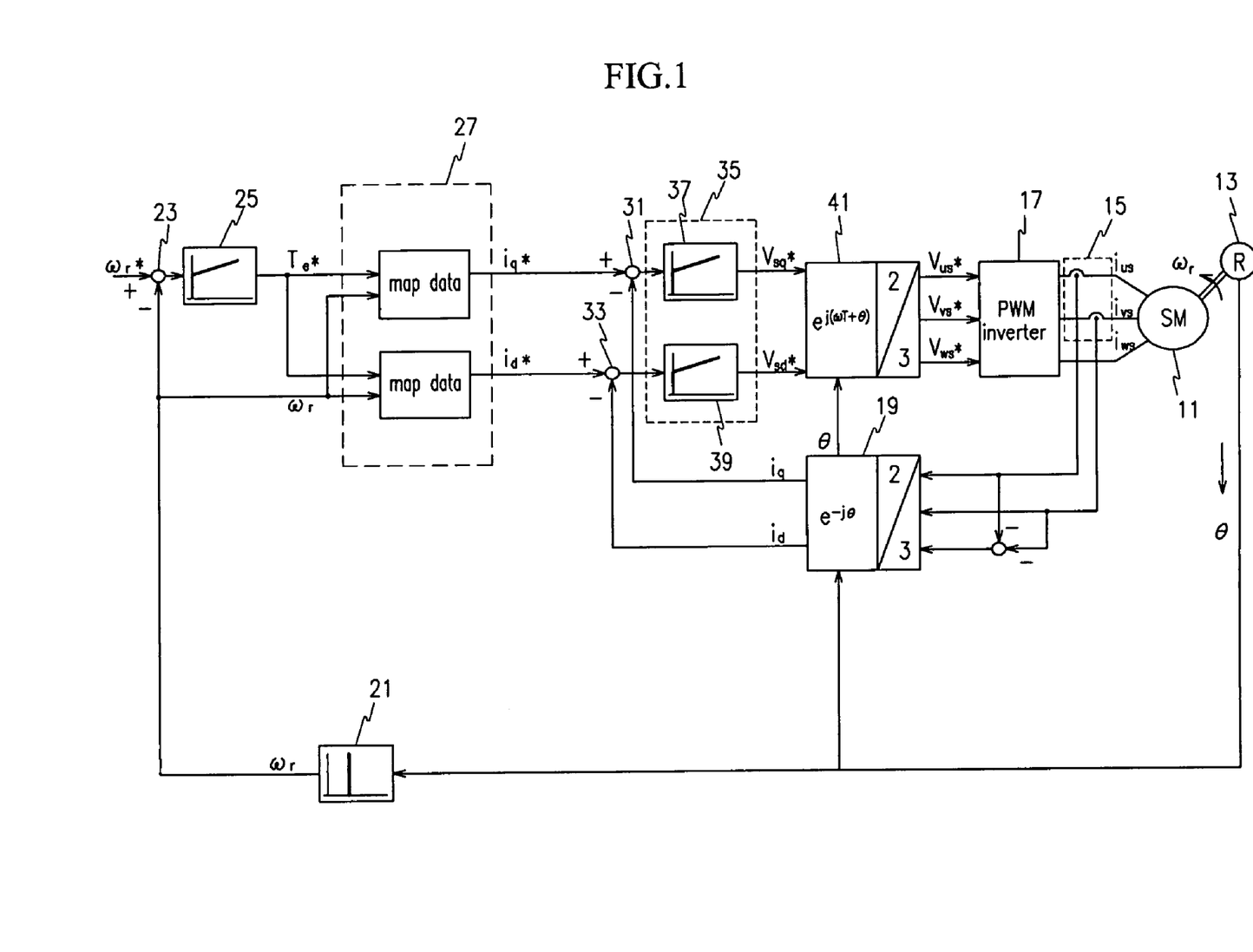
FIG. 1 is a schematic diagram of a control system for a permanent magnet synchronous motor according to an embodiment of the present invention.

In FIG. 1, reference numeral 11 denotes a permanent magnet synchronous motor. For example, the permanent magnet synchronous motor 11 can be an interior permanent magnet synchronous motor (IPMSM). A position detection member 13 detects an absolute angular position θ of the permanent magnet synchronous motor 11. The absolute angular position means an angular position at which a current is applied to the permanent magnet synchronous motor 11. The detection of the absolute angular position is well known in the art, so further explanation thereof will be omitted. For example, the position detection member 13 can be a resolver. Hereinafter, the reference numeral 13 will refer to a resolver.

A current detector 15 detects currents $i_{us}$ and $i_{vs}$ input into the permanent magnet synchronous motor 11 that are caused by output voltages $V_{us}$, $V_{vs}$, and $V_{ws}$ of a PWM inverter 17. A three phase/d-q coordinate converter 19 converts currents input from the current detector 15 into a q-axis current feedback signal (i.e., torque split current feedback signal) $i_q$ and a d-axis current feedback signal (i.e., magnetic flux split current feedback signal) $i_d$ using the absolute angular position θ input from the resolver.

An angular speed calculator 21 calculates an angular speed $\omega_r$ based on the absolute angular position θ output from the resolver 13. For example, the angular speed calculator 21 may include a differentiator. A subtracter 23 calculates an angular speed difference between an angular speed command value $\omega_r^*$ and the calculated angular speed $\omega_r$. A speed controller 25 receives the angular speed difference calculated by the subtracter 23, and outputs a torque command $T_e^*$ corresponding to the input angular speed difference. For example, the speed controller 25 may include a proportional integration controller (PI controller).

A current command generator 27 receives the torque command $T_e^*$ from the speed controller 25 and the angular speed $\omega_r$ from the angular speed calculator 21. The current command generator 27 generates a torque split current command (i.e., q-axis current command) $i_q^*$ and a magnetic flux split current command (i.e., d-axis current command) $i_d^*$ corresponding to the torque command and the angular speed, based on at least one of predetermined motoring current command data and predetermined generating current command data.

The predetermined motoring current command data includes predetermined motoring q-axis current command and predetermined motoring d-axis current command, and the predetermined generating current command data includes predetermined generating q-axis current command data and predetermined generating d-axis current command data. The motoring current command data are data for calculating a current command when the permanent magnet synchronous motor 11 operates in a motoring mode, and the generating current command data are data for calculating a current command when the permanent magnet synchronous motor 11 operates in a generating mode.

The predetermined motoring q-axis current command data include a plurality of optimal q-axis current command values that are respectively mapped with respect to a plurality of torque values and a plurality of angular velocities when the permanent magnet synchronous motor 11 operates in the motoring mode, and the predetermined motoring d-axis current command data include a plurality of optimal d-axis current command values that are respectively mapped with respect to a plurality of torque values and a plurality of angular velocities when the permanent magnet synchronous motor 11 operates in the motoring mode.

The predetermined generating q-axis current command data include a plurality of optimal q-axis current command values that are respectively mapped with respect to a plurality of torque values and a plurality of angular velocities when the permanent magnet synchronous motor 11 operates in the generating mode, and the predetermined generating d-axis current command data include a plurality of optimal d-axis current command values that are respectively mapped with respect to a plurality of torque values and a plurality of angular velocities when the permanent magnet synchronous motor 11 operates in the generating mode.

Such q-axis current command data for the generating and motoring modes can be determined through experiments. For example, the optimal q-axis current command and the d-axis current command can be determined through experiments using a bi-directional dynamometer. At this time, the q-axis current command and the d-axis current command is preferably determined such that a maximum torque per ampere MTPA and a flux weakening control at high speed can be realized.

Figure 7:
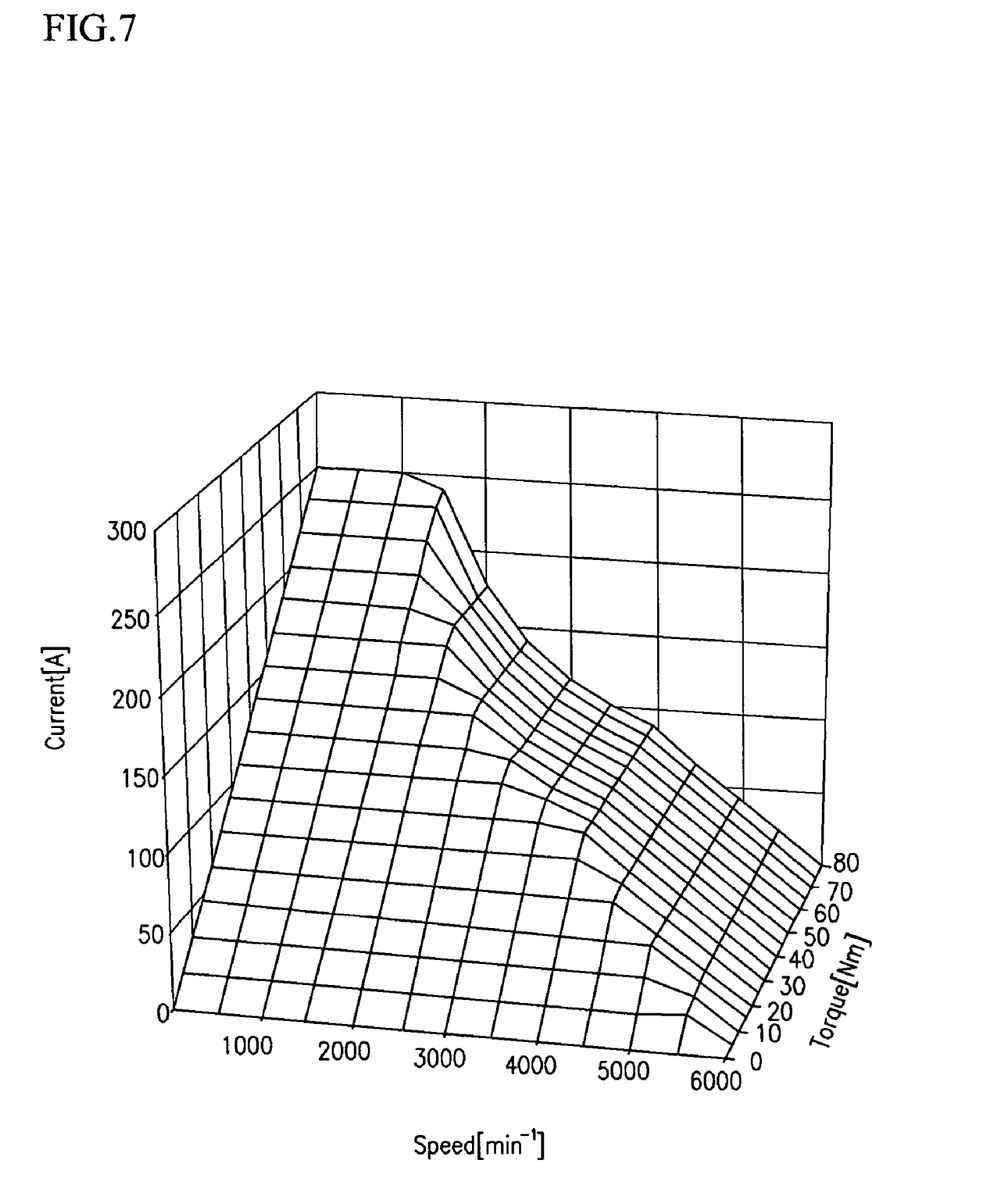
FIGS. 7 and 8 show examples of the current command data.
Figure 8:
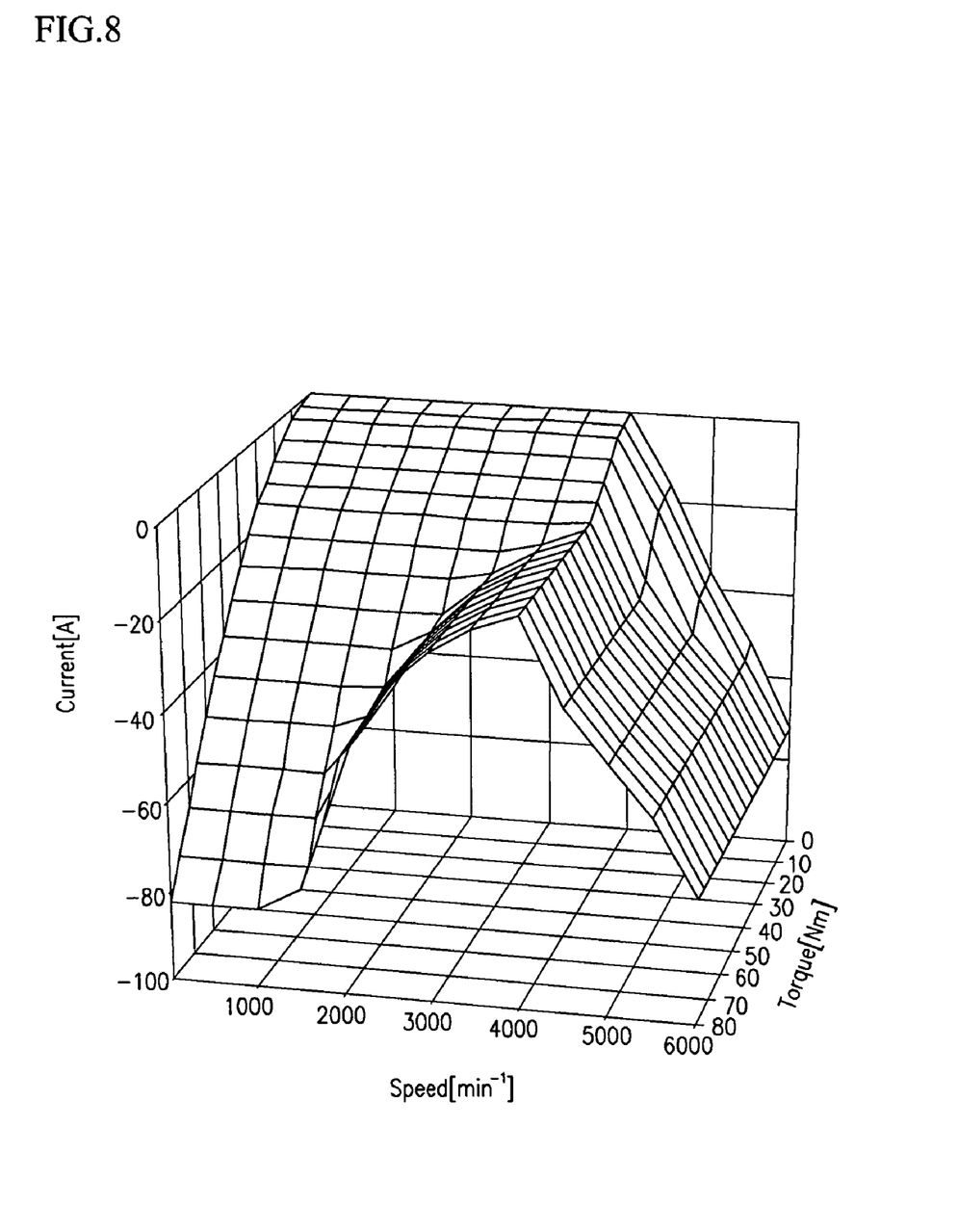

Examples of current command data determined through experiments are shown in FIGS. 7 and 8. FIG. 7 shows the q-axis current command data during the motoring mode, and FIG. 8 shows the d-axis current command data during the motoring mode.

Figure 2:
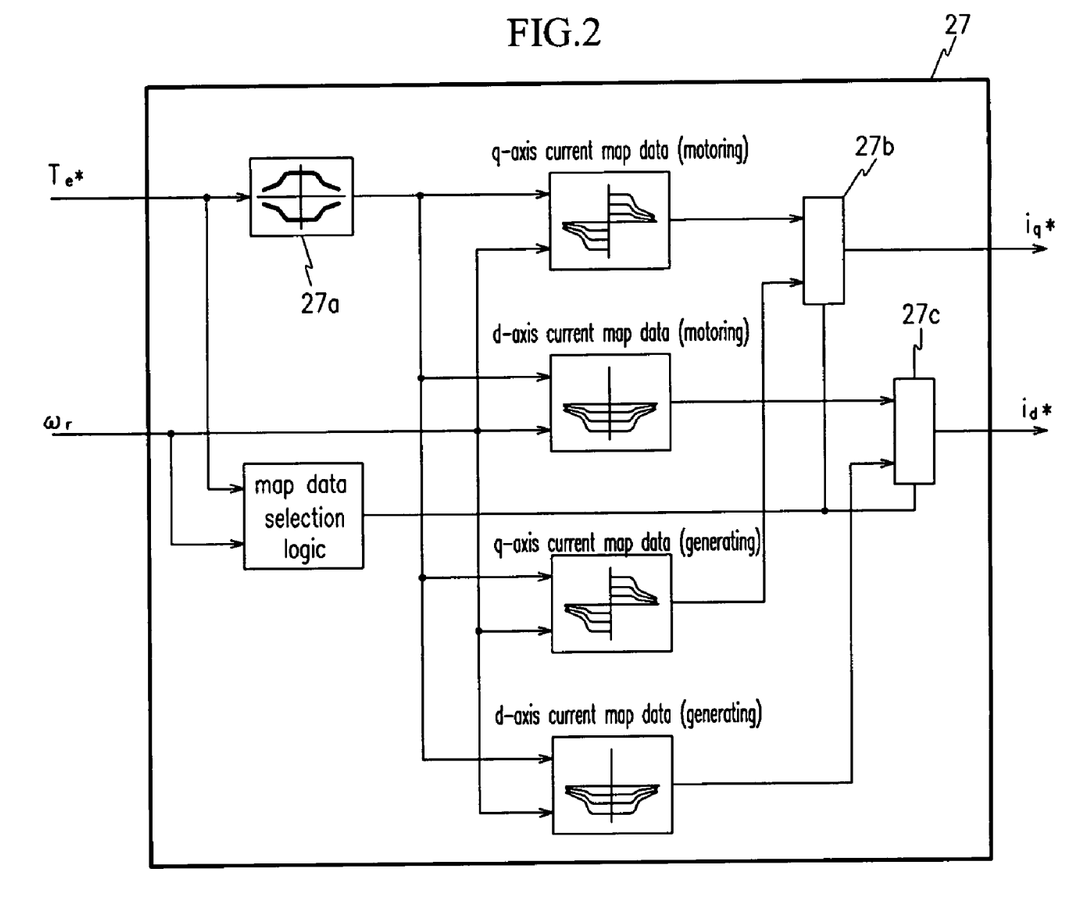
FIG. 2 is a block diagram of a current command generator of the control system of FIG. 1.

Referring to FIG. 2, processes, which are performed by the current command generator 27, for generating the q-axis current command and the d-axis current command will be explained.

The current command generator 27 includes a torque limiter 27a for limiting the torque command to be lower than a predetermined maximum torque. The predetermined maximum torque may be a maximum torque at which a motor can operate in a normal output range, and it is preferably determined for angular speed.

If the input torque command $T_e^*$ is greater than the predetermined maximum torque, the torque limiter 27a sets the torque command $T_e^*$ as the predetermined maximum torque. In addition, the current command generator 27 selects one of either the motoring current command data or the generating current command data through a map data selection logic.

At this time, preferably, the map data selection logic selects one of either the motoring current command data or the generating current command data based on the torque command and the angular speed. More particularly, the predetermined motoring current command data is selected if both the angular speed and the torque command are greater than 0, the predetermined generating current command data is selected if the angular speed is greater than 0 and the torque command is not greater than 0, the predetermined generating current command data is selected if the angular speed is not greater than 0 and the torque command is greater than 0, and the predetermined motoring current command data is selected if both the angular speed and the torque command are not greater than 0.

The current command generator 27 generates the q-axis current command and the d-axis current command responding to the input torque command and the angular speed using the predetermined motoring q-axis current command data, the predetermined motoring d-axis current command data, the predetermined generating q-axis current command data, and the predetermined generating d-axis current command data.

The current command generator 27 further includes a first multiplexer 27b and a second multiplexer 27c that output the q-axis and d-axis current commands that are generated based on the selected data.

The first multiplexer 27b receives a selection signal from the map data selection logic and outputs the d-axis current command that is generated according to the selection signal. Similarly, the second multiplexer 27c receives a selection signal from the map data selection logic and outputs the q-axis current command that is generated according to the selection signal. Consequently, the current command generator 27 selects one of either the motoring current command data or the generating current command data based on the torque command and the angular speed, and outputs the q-axis current command and the d-axis current command that are calculated based on the selected data.

A subtracter 31 calculates a difference between the q-axis current command $i_q^*$ input from the current command generator 27 and the q-axis current feedback signal input $i_q$ from the three phase/d-q coordinate converter 19. A subtracter 33 calculates a difference between the d-axis current command $i_d^*$ input from the current command generator 27 and the d-axis current feedback signal input $i_d$ from the three phase/d-q coordinate converter 19.

A current controller 35 includes a q-axis current controller 37 and a d-axis current controller 39. The q-axis current controller 37 generates a q-axis voltage command $V_{sq}^*$ based on the difference between the q-axis current command $i_q^*$ and the q-axis current feedback signal input $i_q$ input from the subtracter 31. The q-axis current controller 37 may include a proportional integration controller (PI controller).

The d-axis current controller 39 generates a d-axis voltage command $V_{sd}^*$ based on the difference between the d-axis current command $i_d^*$ and the d-axis current feedback signal $i_d$ input from the subtracter 33. The d-axis current controller 39 may include a proportional integration controller (PI controller). A d-q/three phase coordinate converter 41 converts the q-axis voltage command $V_{sq}^*$ and the d-axis voltage command $V_{sd}^*$ into three phase voltage commands $V_{us}^*$, $V_{vs}^*$, and $V_{ws}^*$ using the absolute angular position θ. A PWM (pulse width modulation) inverter 17 performs a pulse width modulation, and thereby outputs voltages $V_{us}$, $V_{vs}$, and $V_{ws}$ which are applied to the permanent magnet synchronous motor 11.

Figure 5:
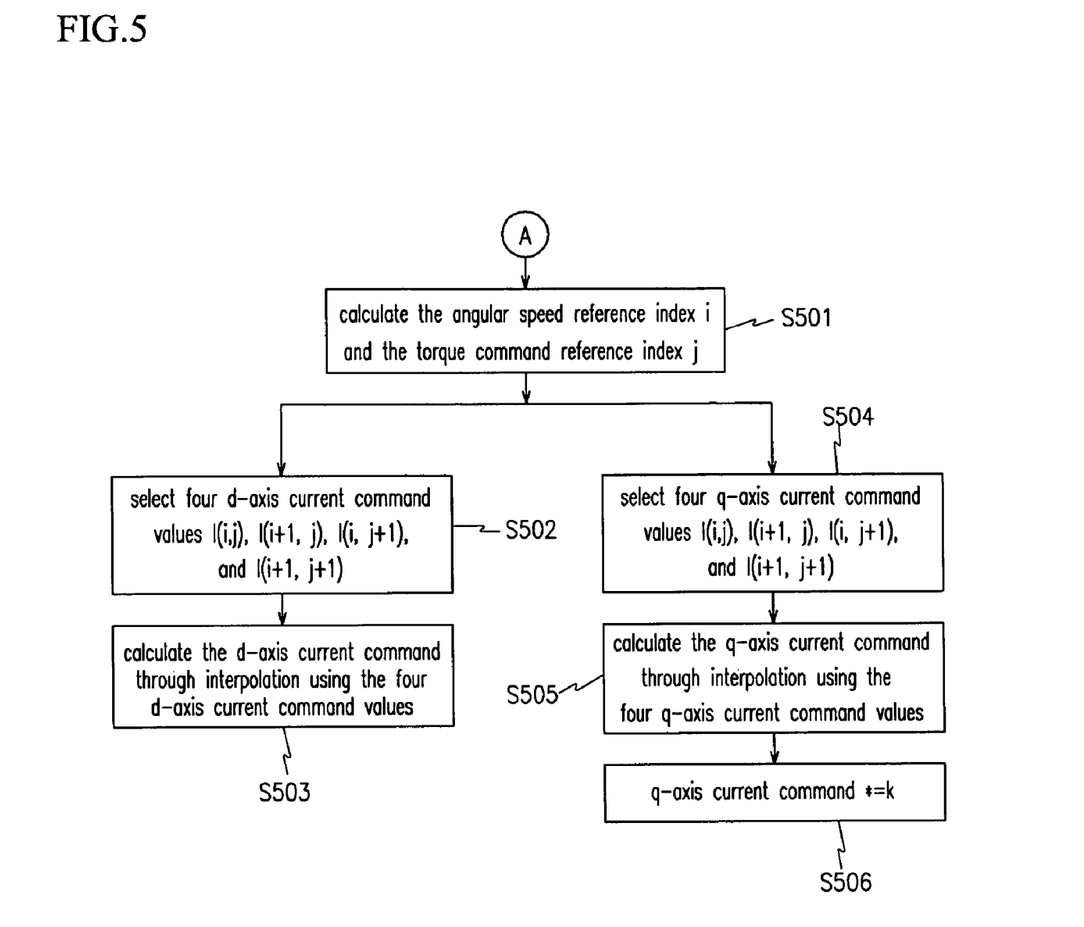
FIG. 5 is a flowchart showing a process of calculating the current command using the selected current command data.

Hereinafter, referring to FIGS. 3 and 5, a control method for a permanent magnet synchronous motor will be explained.

Figure 3:
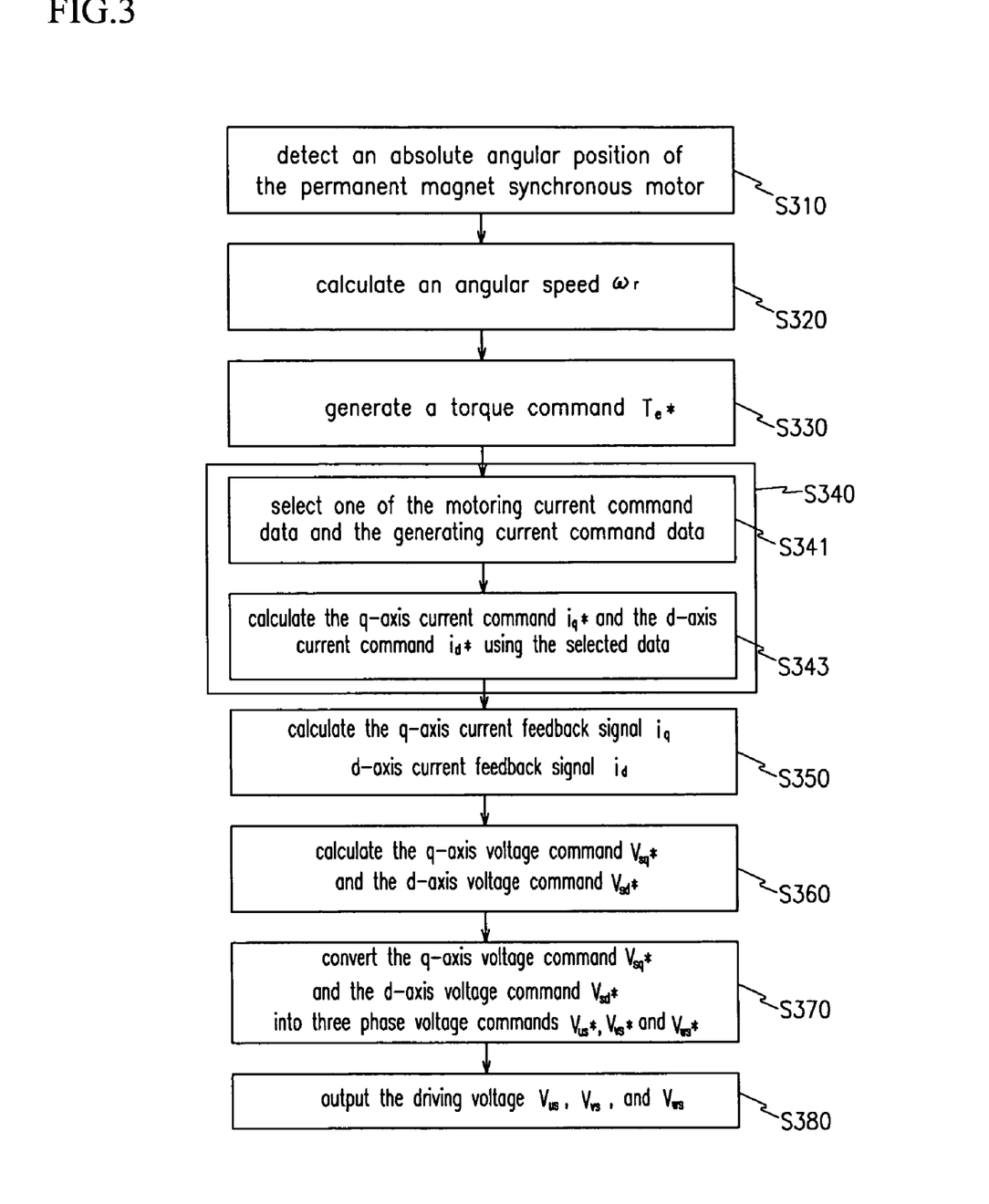
FIG. 3 is a flowchart of a control method for a permanent magnet synchronous motor according to an embodiment of the present invention.

As shown in FIG. 3, in step S310, the resolver 13 detects the absolute angular position θ of the permanent magnet synchronous motor 11. At step S320, the angular speed calculator 21 calculates the angular speed $\omega_r$ based on the detected angular position θ. Then, at step S330, the speed controller 25 generates the torque command $T_e^*$ based on the input angular speed difference between the angular speed command value $107_r^*$ and the calculated angular speed $\omega_r$.

At step S340, the current command generator 27 generates the q-axis current command $i_q^*$ and the d-axis current command $i_d^*$ corresponding to the torque command $T_e^*$ and the angular speed $\omega_r$, based on at least one of predetermined motoring current command data and predetermined generating current command data.

As stated in the above, the predetermined motoring current command data includes predetermined motoring q-axis current command and predetermined motoring d-axis current command, and the predetermined generating current command data includes predetermined generating q-axis current command data and predetermined generating d-axis current command data.

Step S340 for generating the current command includes step S341 of selecting one of either the motoring current command data or the generating current command data based on the torque command $T_e^*$ and the angular speed $\omega_r$, and step S343 of calculating the q-axis current command $i_q^*$ and the d-axis current command $i_d^*$ corresponding to the torque command $T_e^*$ and the angular speed $\omega_r$ using the selected data.

Figure 4:
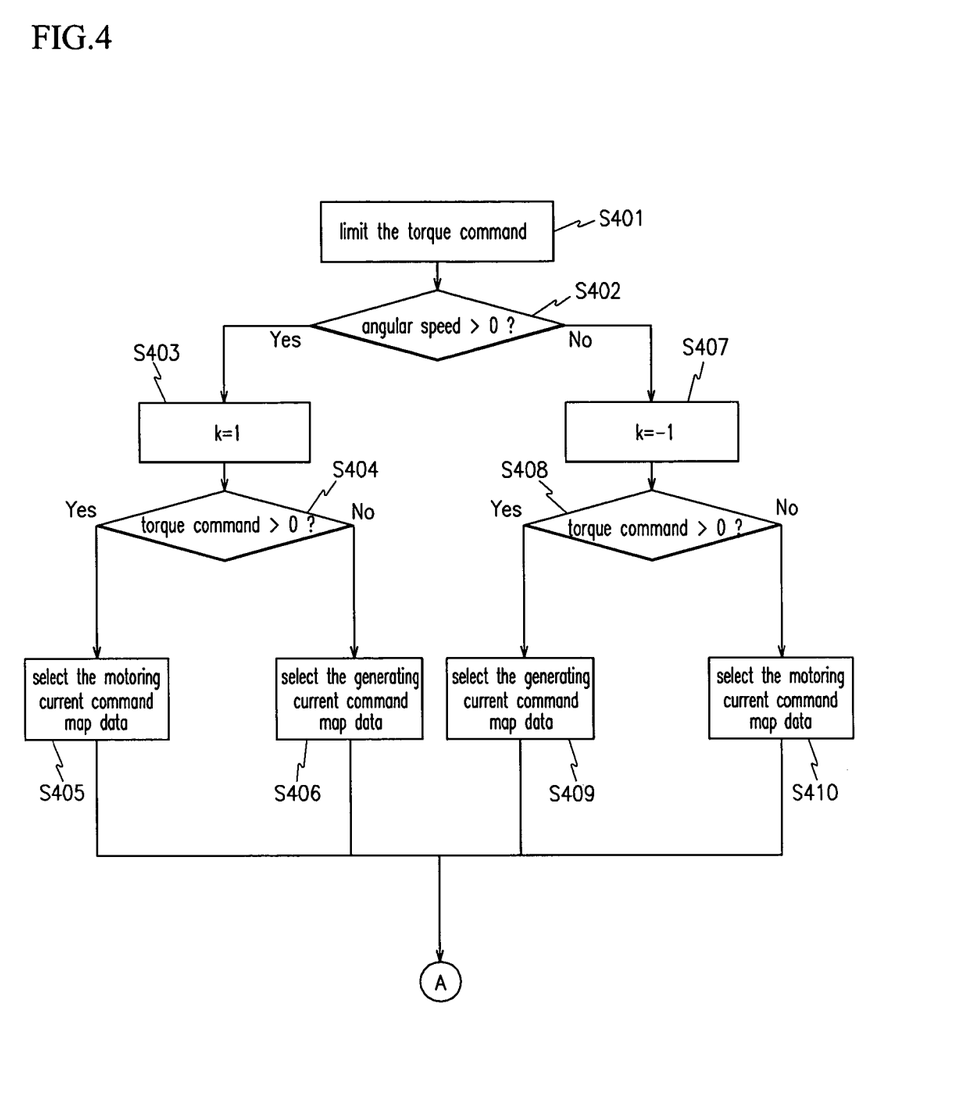
FIG. 4 is a flowchart showing a process of selecting the current command data.

The data selection step S341 will be explained with reference to FIG. 4.

In step S401, the torque command is limited to be less than the predetermined maximum torque value (maximum normal output). That is, the torque command is set as the predetermined maximum torque if the torque command is greater than the predetermined maximum torque, and the torque command is maintained as a current value if the torque command is not greater than the predetermined maximum torque. Then, one of either the predetermined motoring current command data or the predetermined generating current command data is selected based on the angular speed and the torque command.

At step S402, it is determined whether the angular speed is higher than 0. If it is determined that the angular speed is higher than 0, at step S402, a q-axis current command calculation factor k is set as 1 at step S403. Then, at step S404, it is determined whether the torque command is greater than 0.

If it is determined that the torque command is greater than 0, at step S404, the motoring current command data (i.e., the motoring q-axis current command data and the motoring d-axis current command data) is selected at step S405. On the other hand, if it is determined that the torque command is not greater than 0, at step S404, the generating current command data (i.e., the generating q-axis current command data and the generating d-axis current command data) is selected at step S406.

Meanwhile, if it is determined that the angular speed is not greater than 0, at step S402, the q-axis current command calculation factor k is set as −1 at step S407. Then, at step S408, it is determined whether the torque command is greater than 0.

If it is determined that the torque command is greater than 0, at step S408, the generating current command data (i.e., the generating q-axis current command data and the generating d-axis current command data) is selected in step S409. On the other hand, if it is determined that the torque command is not greater than 0, at step S408, the motoring current command data (i.e., the motoring q-axis current command data and the motoring d-axis current command data) is selected at step S410.

Hereinafter, step S343 for calculating the current command will be explained with reference to FIG. 5.

The current command calculation step S343 includes a step of calculating the d-axis current command corresponding to the torque command and the angular speed through interpolation using the selected data, and a step of calculating the q-axis current command corresponding to the torque command and the angular speed through interpolation using the selected data.

Figure 6:
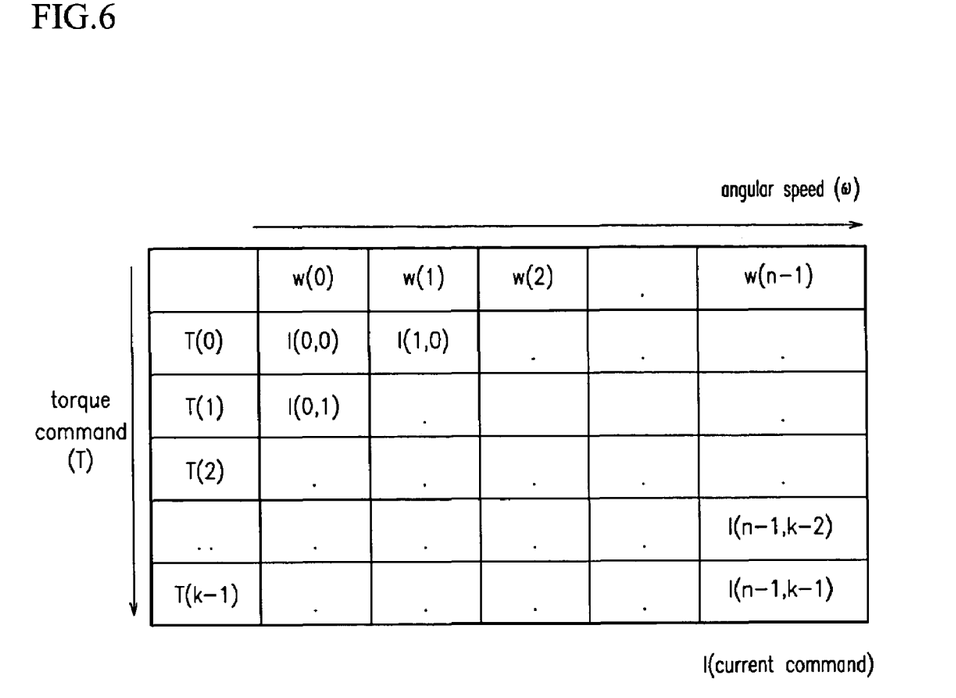
FIG. 6 shows an example of the current command data.

Hereinafter, as shown in FIG. 6, the calculation of the q-axis current command and the d-axis current command through interpolation will be explained with examples in which each of the generating q-axis and d-axis current command data and the motoring q-axis and d-axis current command data have current command values of n×k that are determined respectively with respect to angular velocities of n and torque commands of k.

At first, at step S501, an angular speed reference index i for the input angular speed and a torque command reference index j for the input torque command are calculated. The reference index may be calculated as a maximum constant that does not exceed an imaginary index corresponding to the input torque command or the input angular speed. The imaginary index can be calculated by comparing the input torque command and the input angular speed to the torque command values and the angular speed values in the selected current command data. For example, in the case that a torque command value corresponding to an index "1" is 100 and a torque command value corresponding to an index "2" is 200 in FIG. 6, if the input torque command is 150, the imaginary index for the torque command is 1.5.

For example, if an imaginary index of the input angular speed corresponds to "5.1" among nine indices from 0 to 8, the angular speed reference index i may be set as "5". Similarly, if an imaginary index of the input torque command corresponds to "4.2" among nine indices from 0 to 8, the torque command reference index j may be set as "4".

After calculating the reference index, at step S502, four d-axis current command values of I(i,j), I(i+1, j), I(i, j+1), and I(i+1, j+1) are selected from the selected d-axis current command data. Then, at step S503, the d-axis current command is calculated through linear interpolation using the selected four d-axis current command values. For example, if the input angular speed is "x" and the input torque command is "y", the corresponding d-axis current command I(x,y) can be calculated through linear interpolation according to the following equation.

$$I(x,y)=C\times(1-B)+D\times B \qquad \text{[Equation]}$$

where $C=I(i,j)+[I(i+1,j)-I(i,j)]\times A$,
$D=I(i,j+1)+[I(i+1,j+1)-I(i,j+1)]\times A$, $$A = \frac{x-w(i)}{w(i+1)-w(i)}, \text{ and } B = \frac{y-T(j)}{T(j+1)-T(j)}.$$

Similarly, at step S504, four q-axis current command values are selected using the reference index from the selected data. Then, at step S505, the q-axis current command is calculated through linear interpolation using the selected four d-axis current command values. Then, at step S506, the calculated q-axis current command is multiplied by the q-axis current command calculation factor k that is calculated in step S403 or S407.

By multiplying the q-axis current command by the q-axis current command calculation factor k, a direction of a torque is regulated according to directions of the angular speed. At step S350, three phase/d-q coordinate converter 19 calculates the q-axis current feedback signal $i_q$ and the d-axis current feedback signal $i_d$ using driving currents and the absolute angular position θ.

The current controller 35, at step S360, generates the q-axis voltage command $V_{sq}$* based on the difference between the q-axis current command $i_q$* and the q-axis current input $i_q$, and the d-axis voltage command $V_{sd}$* based on the difference between the d-axis current command $i_d$* and the d-axis current feedback signal $i_d$.

The d-q/three phase coordinate converter 41, at step S370, converts the q-axis voltage command $V_{sq}$* and the d-axis voltage command $V_{sd}$* into three phase voltage commands $V_{us}$*, $V_{vs}$*, and $V_{ws}$*. At step S380, the PWM inverter 17 outputs voltages $V_{us}$, $V_{vs}$, and $V_{ws}$ for driving the permanent magnet synchronous motor 11 using the three phase voltage commands $V_{us}$*, $V_{vs}$*, and $V_{ws}$*.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

According to the control system of the permanent magnet synchronous motor and the control method thereof, the d-axis current command and the q-axis current command are determined from the predetermined map data, so that a precise torque control can be achieved and a stable flux weakening control at high speed is also possible. In addition, load of calculation for the control is decreased so that a stable motor control is possible even without a high performance controller.

What is claimed is:

1. A control system for controlling a permanent magnet synchronous motor comprising:
a position detection member for detecting an absolute angular position of the permanent magnet synchronous motor and outputting a corresponding signal;
an angular speed calculator calculating an angular speed using the signal of the position detection member;
a speed controller generating a torque command based on a difference between an angular speed command value and the calculated angular speed;
a current command generator receiving the torque command from the speed controller and the angular speed from the angular speed calculator, and generating a q-axis current command and a d-axis current command corresponding to the torque command and the angular speed using one of either predetermined motoring current command data or predetermined generating current command data;

a three phase/d-q coordinate converter for generating a q-axis current feedback signal and a d-axis current feedback signal based on driving currents applied to the permanent magnet synchronous motor and the signal of the position detection member;

a current controller generating a q-axis voltage command and a d-axis voltage command based on a difference between the q-axis current command and the q-axis current feedback signal and a difference between the d-axis current command and the d-axis current feedback signal;

a d-q/three phase coordinate converter converting the q-axis current command and the d-axis current command into three phase voltage commands; and an inverter outputting a driving voltage for driving the permanent magnet synchronous motor using the three phase voltage commands.

2. The control system of claim 1, wherein the predetermined motoring current command data comprises predetermined motoring q-axis current command data and predetermined motoring d-axis current command data, and wherein the predetermined generating current command data comprises predetermined generating q-axis current command data and predetermined generating d-axis current command data.

3. The control system of claim 2, wherein the predetermined motoring q-axis current command data include a plurality of optimal q-axis current command values that are respectively determined with respect to a plurality of torque values and a plurality of angular velocities when the permanent magnet synchronous motor operates in a motoring mode, wherein the predetermined motoring d-axis current command data include a plurality of optimal d-axis current command values that are respectively determined with respect to a plurality of torque values and a plurality of angular velocities when the permanent magnet synchronous motor operates in the motoring mode, wherein the predetermined generating q-axis current command data include a plurality of optimal q-axis current command values that are respectively determined with respect to a plurality of torque values and a plurality of angular velocities when the permanent magnet synchronous motor operates in a generating mode, and wherein the predetermined generating d-axis current command data include a plurality of optimal d-axis current command values that are respectively determined with respect to a plurality of torque values and a plurality of angular velocities when the permanent magnet synchronous motor operates in the generating mode.

4. The control system of claim 1, wherein the current command generator selects one of either the motoring current command data or the generating current command data based on the torque command and the angular speed and generates the q-axis current command and the d-axis current command at the torque command and the angular speed using the selected data.

5. The control system of claim 4, wherein if both the angular speed and the torque command are greater than 0, the current command generator selects the predetermined motoring current command data, and generates the q-axis current command and the d-axis current command at the torque command and the angular speed using the predetermined motoring current command data.

6. The control system of claim 4, wherein if the angular speed is greater than 0 and the torque command is not greater than 0, the current command generator selects the predetermined generating current command data, and generates the q-axis current command and the d-axis current command at the torque command and the angular speed using the predetermined generating current command data.

7. The control system of claim 4, wherein if the angular speed is not greater than 0 and the torque command is greater than 0, the current command generator selects the predetermined generating current command data, and generates the q-axis current command and the d-axis current command at the torque command and the angular speed using the predetermined generating current command data.

8. The control system of claim 4, wherein if both the angular speed and the torque command are not greater than 0, the current command generator selects the predetermined motoring current command data, and generates the q-axis current command and the d-axis current command at the torque command and the angular speed using the predetermined motoring current command data.

9. The control system of claim 4, wherein the current command generator calculates the q-axis current command and the d-axis current command at the torque command and the angular speed through interpolation using the selected data.

10. The control system of claim 4, wherein the current command generator generates the q-axis current command as a value acquired by multiplying the calculated q-axis current command that is calculated from the selected data by −1 if the angular speed is less than 0.

11. The control system of claim 4, wherein if the torque command is greater than a predetermined maximum torque, the current command generator resets the torque command with the predetermined maximum torque and generates the q-axis current command and the d-axis current command at the reset torque command and the angular speed.

12. A control method for controlling a permanent magnet synchronous motor comprising:

detecting an absolute angular position of the permanent magnet synchronous motor;

calculating an angular speed based on the detected absolute angular position;

generating a torque command based on a difference between an angular speed command value and the calculated angular speed;

generating a q-axis current command and a d-axis current command corresponding to the torque command and the angular speed, based on one of either predetermined motoring current command data or predetermined generating current command data;

calculating a q-axis current and a d-axis current feedback signal, based on driving currents applied to the permanent magnet synchronous motor and the detected absolute angular position;

generating a q-axis voltage command and a d-axis voltage command, based on a difference between the q-axis current command and the q-axis current feedback signal and a difference between the d-axis current command and the d-axis current feedback signal;

converting the q-axis voltage command and the d-axis voltage command into three phase voltage commands; and outputting driving voltages for driving the permanent magnet synchronous motor, based on the converted three phase voltage commands.

13. The control method of claim 12, wherein the predetermined motoring current command data comprises predetermined motoring q-axis current command data and predetermined motoring d-axis current command data, and wherein the predetermined generating current command data comprises predetermined generating q-axis current command data and predetermined generating d-axis current command data.

14. The control method of claim 13, wherein the predetermined motoring q-axis current command data include a plurality of optimal q-axis current command values that are respectively determined with respect to a plurality of torque values and a plurality of angular velocities when the permanent magnet synchronous motor operates in a motoring mode, wherein the predetermined motoring d-axis current command data include a plurality of optimal d-axis current command values that are respectively determined with respect to a plurality of torque values and a plurality of angular velocities when the permanent magnet synchronous motor operates in the motoring mode, wherein the predetermined generating q-axis current command data include a plurality of optimal q-axis current command values that are respectively determined with respect to a plurality of torque values and a plurality of angular velocities when the permanent magnet synchronous motor operates in a generating mode, and wherein the predetermined generating d-axis current command data include a plurality of optimal d-axis current command values that are respectively determined with respect to a plurality of torque values and a plurality of angular velocities when the permanent magnet synchronous motor operates in the generating mode.

15. The control method of claim 12, wherein the generating of a q-axis current command and a d-axis current command comprises:

selecting one of either the motoring current command data or the generating current command data based on the torque command and the angular speed; and generating the q-axis current command and the d-axis current command at the torque command and the angular speed using the selected data.

16. The control method of claim 15, wherein the selecting comprises:

resetting the torque command with a predetermined maximum torque value if the torque command is greater than the predetermined maximum torque value, or maintaining the torque command if the torque command is not greater than the predetermined maximum torque value;

determining whether the angular speed is greater than 0;

determining whether the torque command is greater than 0; and selecting the predetermined motoring current command data if both the angular speed and the torque command are greater than 0, selecting the predetermined generating current command data if the angular speed is greater than 0 and the torque command is not greater than 0, selecting the predetermined generating current command data if the angular speed is not greater than 0 and the torque command is greater than 0, or selecting the predetermined motoring current command data if both the angular speed and the torque command are not greater than 0.

17. The control method of claim 15, wherein the generating of the q-axis current command and the d-axis current command comprises:

calculating the d-axis current command corresponding to the torque command and the angular speed through interpolation using the selected data; and calculating the q-axis current command corresponding to the torque command and the angular speed through interpolation using the selected data.

18. The control method of claim 17, wherein calculating the q-axis current command generates the q-axis current command as a value acquired by multiplying the calculated q-axis current command that is calculated from the selected data by −1 if the angular speed is less than 0.

* * * * *